(12) United States Patent
Takahashi

(10) Patent No.: US 7,437,057 B2
(45) Date of Patent: Oct. 14, 2008

(54) IMAGE CONTROLLING CIRCUIT, IMAGE CONTROLLING METHOD, AND COMPUTER READABLE MEDIUM, WHEREIN PROGRAMS TO EXECUTE THE IMAGE CONTROLLING METHOD ON A COMPUTER SYSTEM ARE STORED

(75) Inventor: Kazunori Takahashi, Tachikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/403,895

(22) Filed: Apr. 14, 2006

(65) Prior Publication Data

US 2006/0193605 A1    Aug. 31, 2006

Related U.S. Application Data

(62) Division of application No. 09/350,144, filed on Jul. 9, 1999, now Pat. No. 7,068,917.

(30) Foreign Application Priority Data

Aug. 18, 1998   (JP)   ................................. 10-231842

(51) Int. Cl.
*H04N 5/91*    (2006.01)
*H04N 7/26*    (2006.01)

(52) U.S. Cl. ......................................... 386/94; 386/109
(58) Field of Classification Search ................... 386/94, 386/46, 52, 95, 1, 4; 360/15, 13; 380/201, 380/203

See application file for complete search history.

(56) References Cited

U.S. PATENT DOCUMENTS

| | | | |
|---|---|---|---|
| 5,133,008 A | 7/1992 | Fujita | |
| 5,151,795 A | 9/1992 | Adachi | |
| 5,208,708 A | 5/1993 | Mok | |
| 5,301,033 A | 4/1994 | Chon | |
| 5,311,323 A | 5/1994 | Honda | |
| 5,315,448 A * | 5/1994 | Ryan | ............................ 360/60 |
| 5,319,706 A | 6/1994 | Mizukata et al. | |
| 5,337,157 A | 8/1994 | Nakata | |
| 5,459,583 A | 10/1995 | Nakata | |
| 5,627,655 A | 5/1997 | Okamoto et al. | |
| 2002/0006229 A1 | 1/2002 | Chao et al. | |

FOREIGN PATENT DOCUMENTS

JP          3-125576          12/1991

(Continued)

OTHER PUBLICATIONS

Japanese Office Action, mailed Feb. 5, 2008 and issued in corresponding Japanese Patent Application No. 1998-231842.

*Primary Examiner*—Robert Chevalier
(74) *Attorney, Agent, or Firm*—Staas & Halsey LLP

(57)    ABSTRACT

An information processing apparatus prevents from illegal copying analogue pictures with copy guard, providing the image controlling circuit and the method. When the copy guard signal is detected, the screen information is processed and stored, is prevented from being stored, or both the screen information and what the copy guard signal has been detected is stored to the storage device. The input video signal or the screen information recorded in a storage device is processed and outputted, outputting the video signal is prohibited, or a copy guard signal is added to the output video signal, when it is copyrighted.

4 Claims, 19 Drawing Sheets

FOREIGN PATENT DOCUMENTS

| | | |
|---|---|---|
| JP | 4-115790 | 4/1992 |
| JP | 4-294697 | 10/1992 |
| JP | 4-325964 | 11/1992 |
| JP | 5-49001 | 2/1993 |
| JP | 5-191772 | 7/1993 |
| JP | 5-347744 | 12/1993 |
| JP | 6-54289 | 2/1994 |
| JP | 6-169432 | 6/1994 |
| JP | 7-235131 | 9/1995 |
| JP | 8-195064 | 7/1996 |
| JP | 9-83920 | 3/1997 |
| JP | 9-98375 | 4/1997 |
| JP | 9-214845 | 8/1997 |

\* cited by examiner

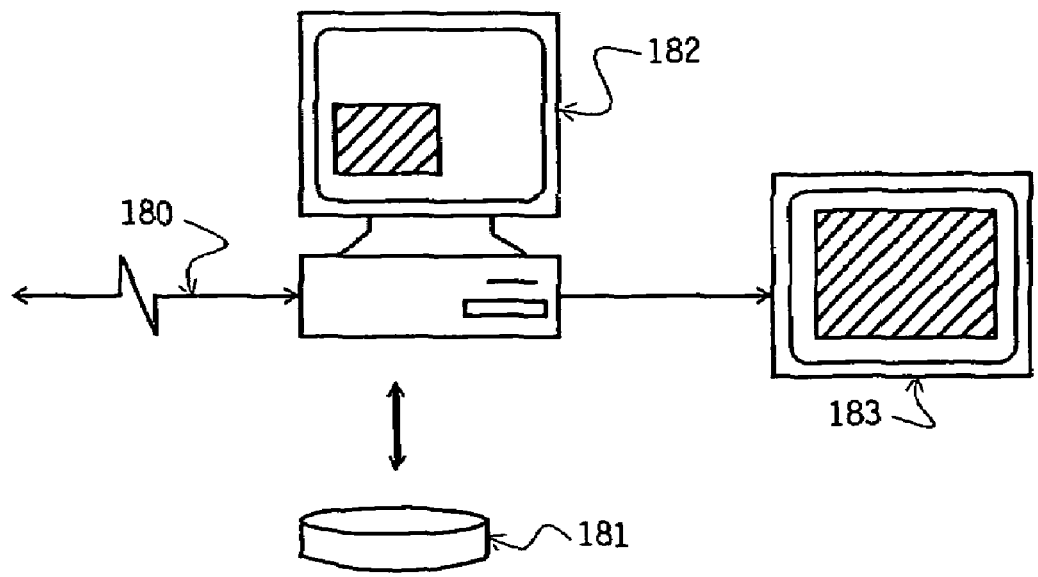
F I G. 1
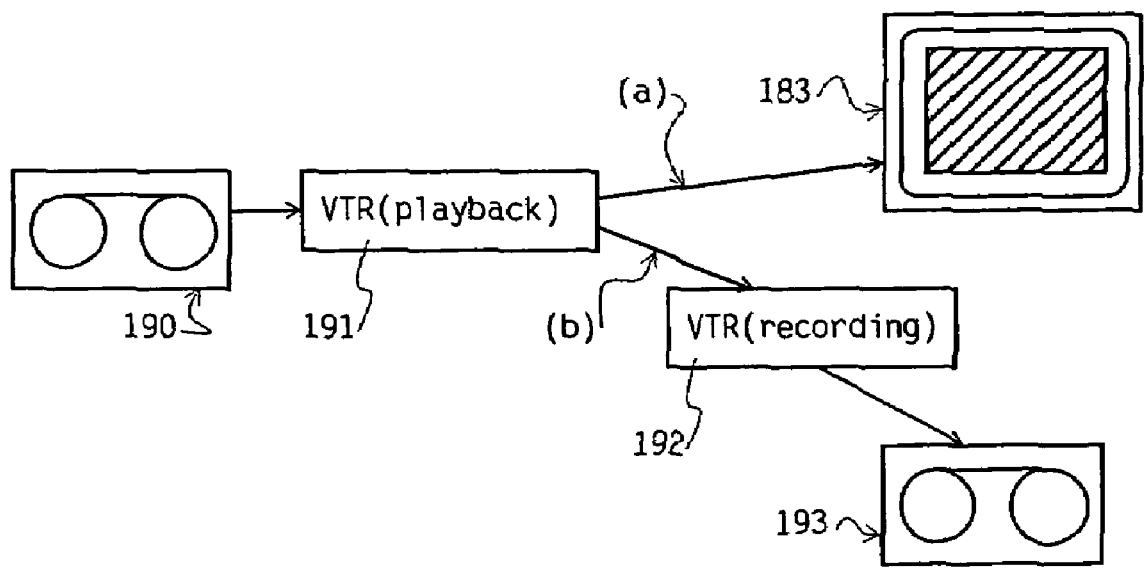
F I G. 2

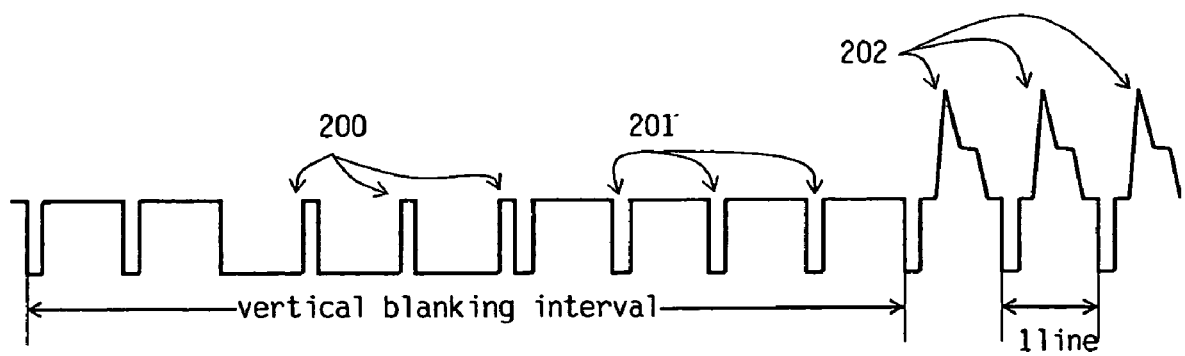
F I G. 3
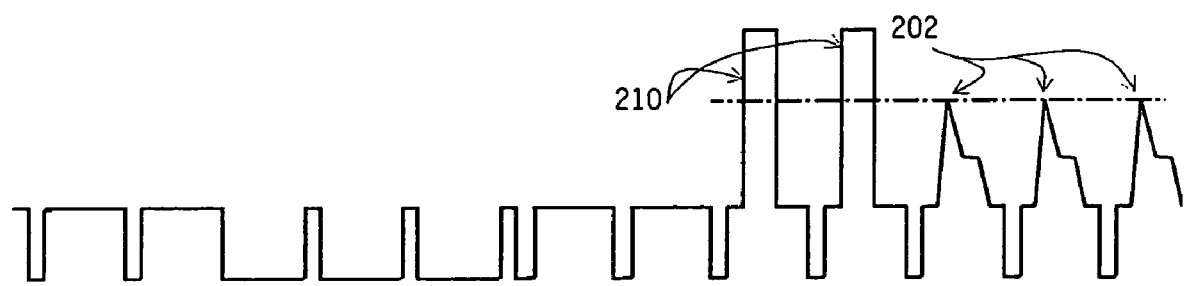
F I G. 4

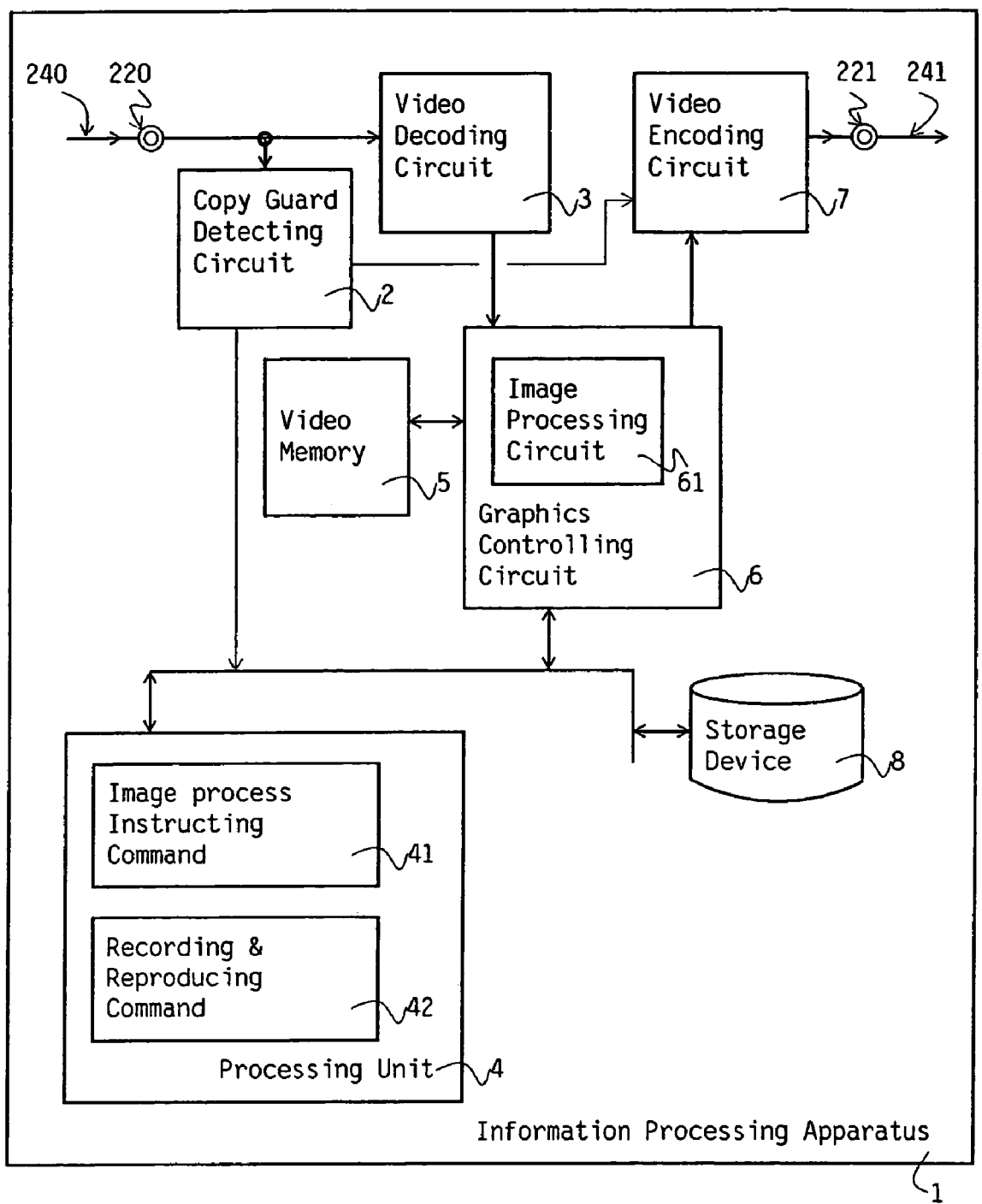
F I G. 1 2

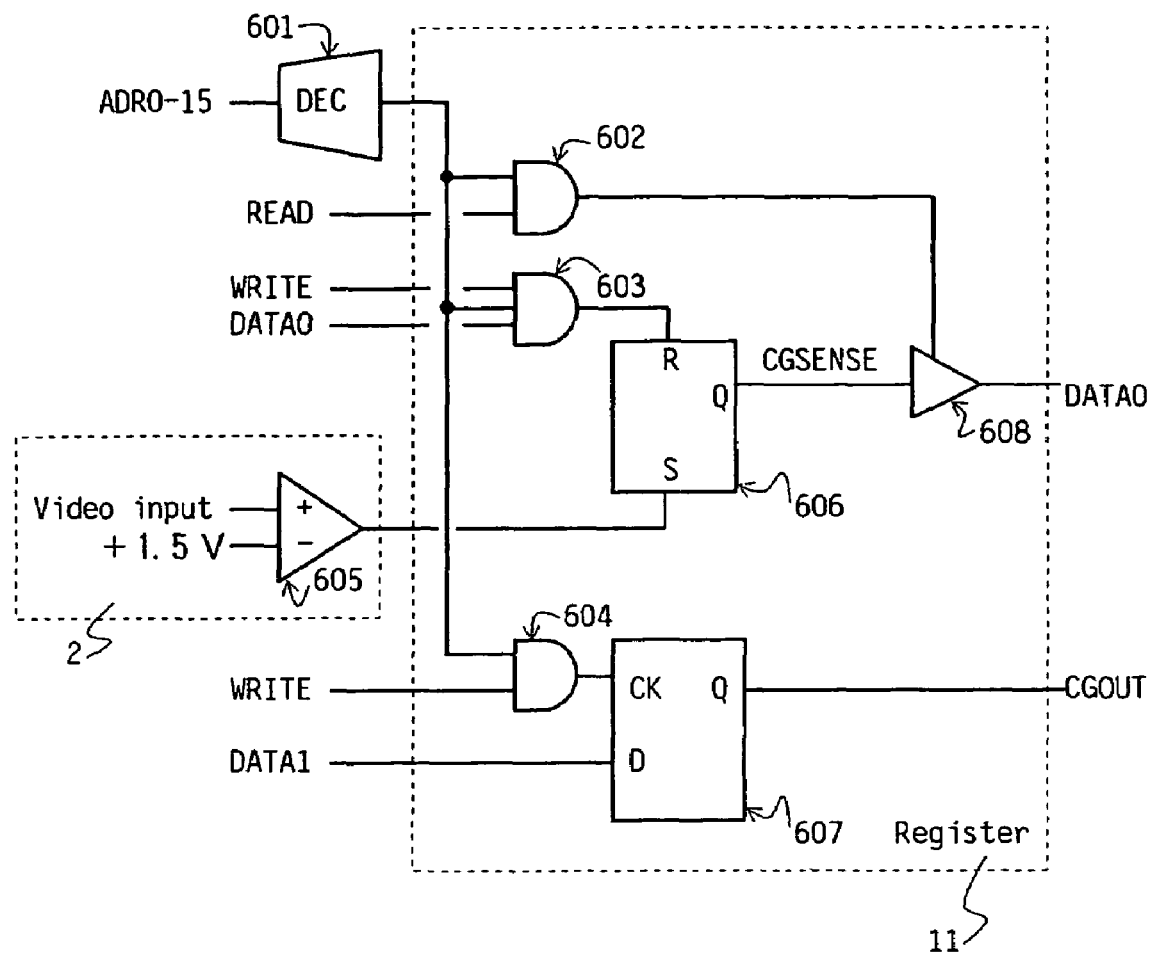
F I G. 17

- Reduction ratio:1/2
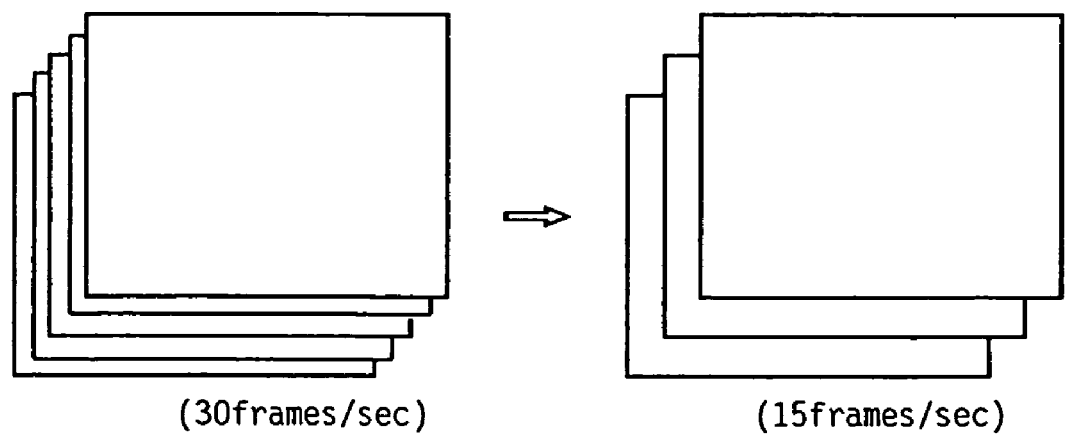
(30frames/sec) → (15frames/sec)
- Reduction ratio:2/3
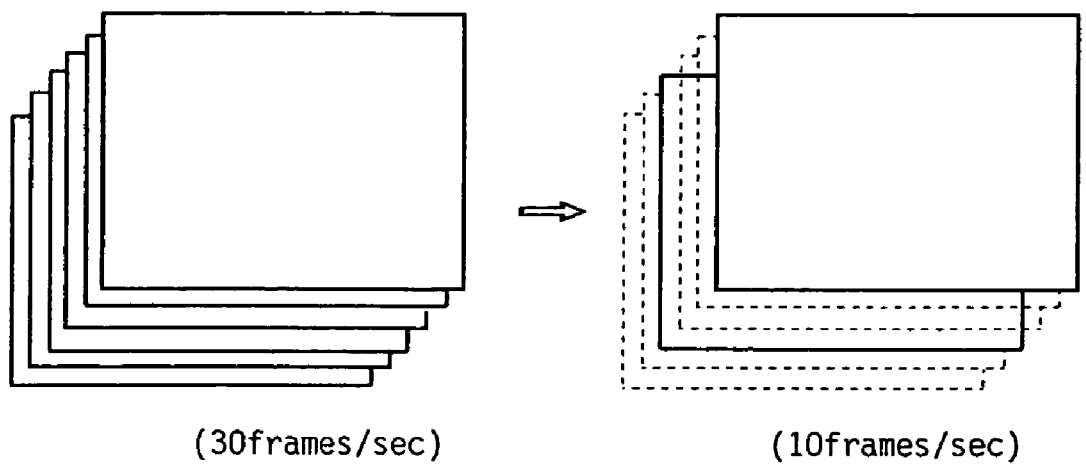
(30frames/sec) → (10frames/sec)
FIG. 19

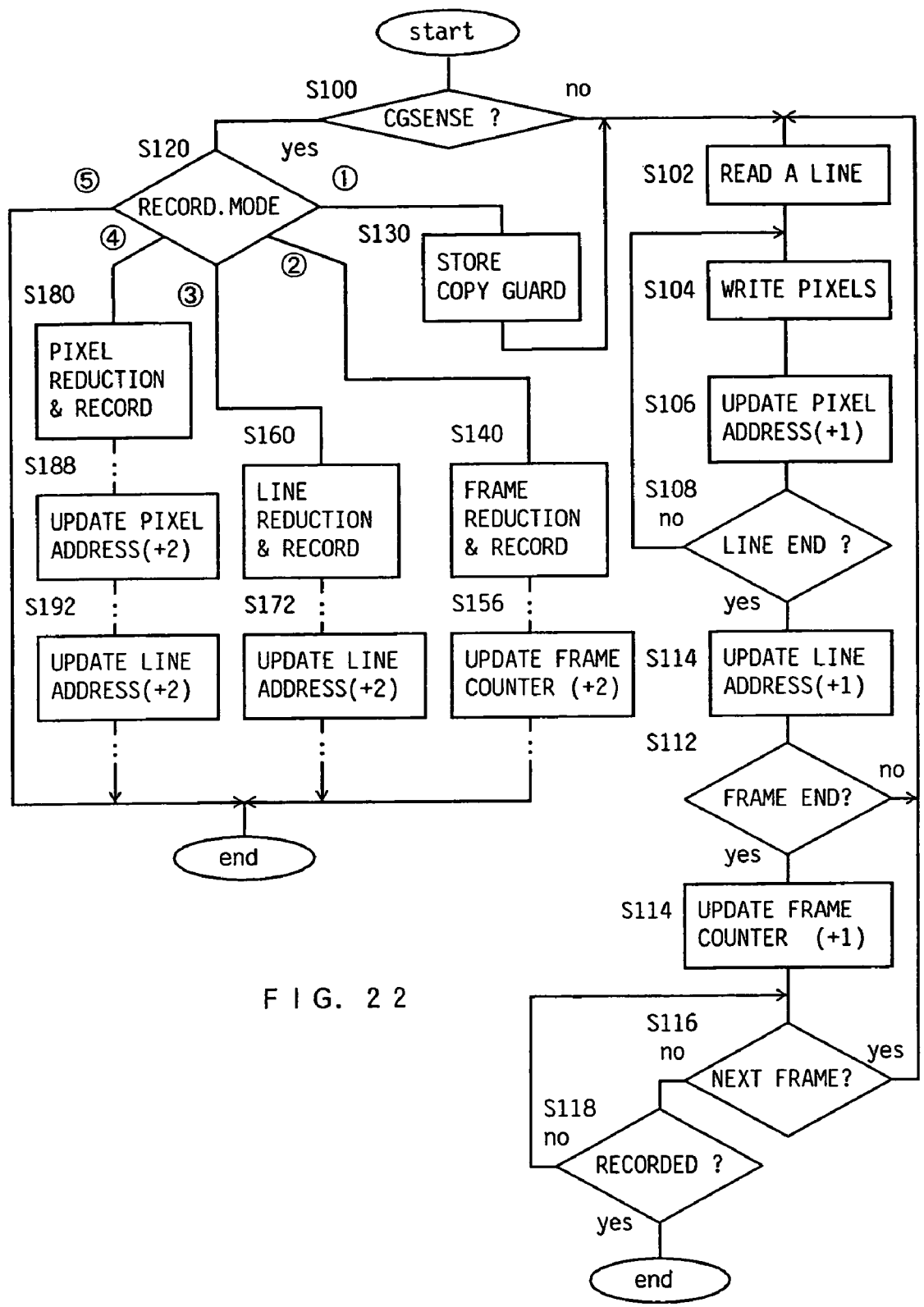
F I G. 2 2

| functions | |
|---|---|
| ☐ lower resolution and record | (a) |
| ☐ lower frame rate and record | (b) |
| ☐ no recording | (c) |
| ☐ stop outputting | (d) |
| ☐ add copy guard | (e) |
| ☐ lower resolution and output | (f) |
| ☐ lower frame rate and output | (g) |

F I G. 2 5

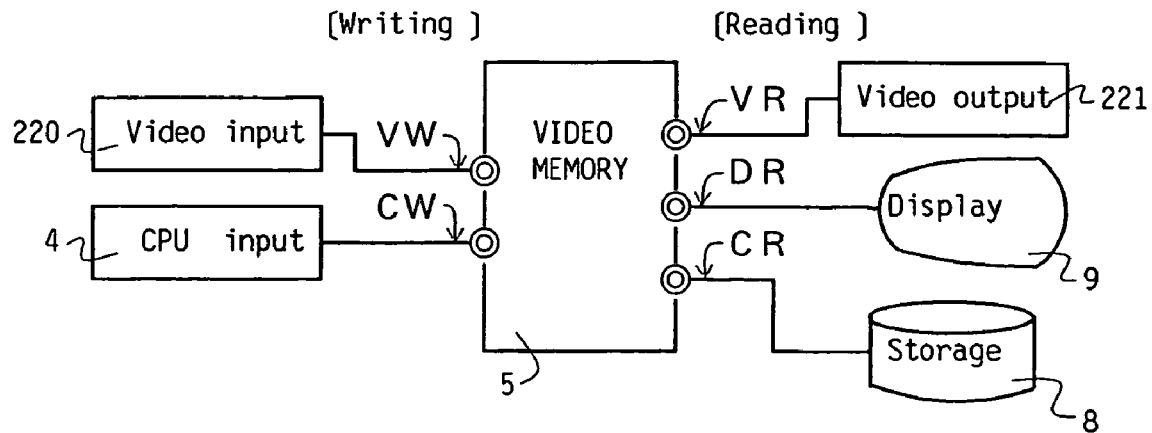
FIG. 26
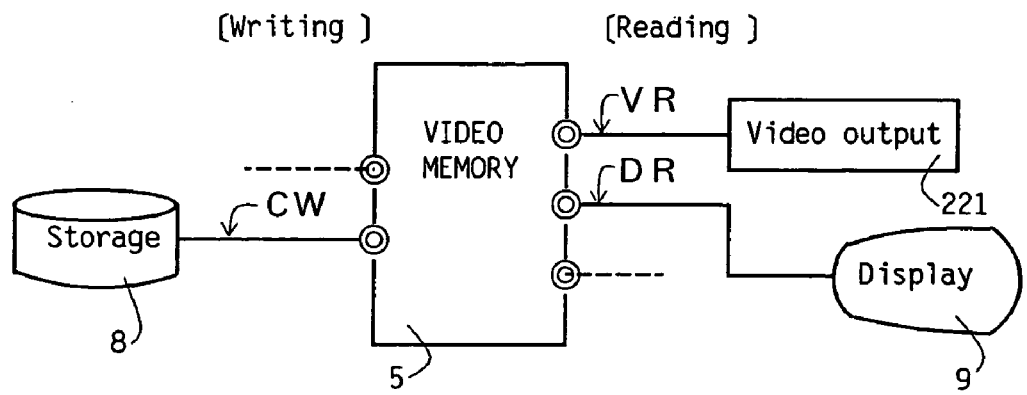
FIG. 27
| Read/Write | W1 | R1 | W2 | R2 | R3 |
|---|---|---|---|---|---|
| Access | VW | DR | CW | VR | CR |
← Basic cycle →
FIG. 28

US 7,437,057 B2

IMAGE CONTROLLING CIRCUIT, IMAGE CONTROLLING METHOD, AND COMPUTER READABLE MEDIUM, WHEREIN PROGRAMS TO EXECUTE THE IMAGE CONTROLLING METHOD ON A COMPUTER SYSTEM ARE STORED

CROSS-REFERENCE TO RELATED APPLICATIONS

This application is a divisional of Ser. No. 09/350,144 filed Jul. 9, 1999 now U.S. Pat. No. 7,068,917. This application claims the benefit of Japanese Application No. 10-231842 filed Aug. 18, 1998, in the Japanese Patent Office, the disclosure of which is incorporated here by reference.

BACKGROUND OF THE INVENTION

1. Field of the Invention

The present invention generally relates to an image processing apparatus which displays pictures or movies on a computer screen while recording a digital signal or outputting a video signal when the video signal is inputted. More particularly, the present invention relates to an image processing apparatus which prevents copying when a video signal including a copy guard signal is inputted.

And more particularly, the present invention relates to an image processing apparatus which prevents from copying when a video signal including a copy guard signal is inputted.

2. Description of the Related Art

Since an information device such as a high performance personal computer or a large capacity storage device, or a high quality digital VTR (Video Tape Recorder) has come into existence recently, it has become easy to copy or duplicate pictures or audio programs using a computer technology. Therefore, the technology both to protect copyright and to give users their convenience has become important increasingly.

Regarding a digital picture or a digital audio provided through an internet or a television, it is well known that the following, for example, is proposed. The sender of programs admits to record programs or music on videotape or tape, step by step, such as; (1) without any restriction, (2) only once, or (3) prohibits from recording completely, and those are distinguished at the receiver.

FIG. 1 shows a drawing for explaining an example of recording or outputting to duplicate a digital signal. The digital picture provided through a line 180 using the internet has been downloaded to a hard disk apparatus 181, and reproduced on a computer screen 182 by an information device such as a personal computer.

If the information device has a function for outputting video signals, it is possible to connect to a television and to reproduce the same picture on the television screen 183 as the computer screen 182.

Regarding an analogue signal, for example, in a VTR currently in use, there are software, or programs provided with some kind of copy guard process in order to protect against illegal copying. And it is possible to display the program normally on the television but the image quality, even if it was recorded, becomes worse at VTR for household use, then it is impossible to record the program on videotape substantially.

In a case of a video printer that prints color images out of videotape, it is known that the printer has a function for protecting output of the printer against illegal copying. According to Japanese laid open patent applications H4-294697, or Japanese laid open patent applications H9-83920, for example, some printer controls AGC (Auto Gain Control) circuit for the period of time and other printer prohibits to issue the picture signals, when a copy guard signal is detected on the videotape.

FIG. 2 shows a drawing for explaining an example of recording and duplicating of a video signal. The analogue picture provided on the videotape 190 currently in use can be reproduced normally on a television screen 183 using VTR (playback) 191 (FIG. 2 (a)), even if a copy guard is applied to the videotape.

However, in a case of recording the videotape 190 to the videotape 193, using VTR (playback) 191 and VTR (recording) 192 (FIG. 2 (b)), if a copy guard is applied to the videotape 190, recording itself may be impossible. The picture becomes very dark, or the image quality becomes worse when it is reproduced, even if it could be recorded. Hence, it is possible to protect against illegal copying as a result.

FIG. 3 and FIG. 4 are time charts for explaining an example of a copy guard signal. There is a video signal not including the copy guard signal in FIG. 3. A video signal of a television screen is generally composed of vertical synchronizing pulses 200 leading other pulses, at each screen, horizontal synchronizing pulses 201, and image signals 202 at each line. The copy guard signal is inserted between a vertical blanking interval, not displayed at the television screen.

A video signal including the copy guard signal 210 is shown in FIG. 4. The copy guard signal 210 has a higher level than the image signal 202 in voltage. Therefore, the AGC circuit of a recording and reproducing device recognizes the high voltage level of the copy guard signal 210 as an ordinary level and makes the voltage level of image signal 202 lowered relatively when the video signal is inputted. Hence, the picture recorded becomes very dark, and it is possible to protect against illegal copying.

Pictures of a videotape current in use are also displayed at a screen of either a personal computer or a workstation. FIG. 5 and FIG. 6 are drawings for explaining examples of a video signal and a computer screen.

Both an input terminal for a video signal and an output terminal for a video signal are provided at a computer. VTR 191, for example, is connected to the input terminal 220 for a video signal which comes from a videotape 190, and a television 183 is connected to the output terminal 221 for a video signal.

FIG. 5, a video signal and a computer screen (1), shows what pictures of the videotape 190 are inputted and monitored at the computer screen 182, and outputted and displayed at the whole screen of the television 183. FIG. 6, a video signal and a computer screen (2), shows what pictures of the videotape 190 are inputted and combined with other windows at the computer screen 182, and outputted and displayed at the television screen 183.

In each case, if a substitute for the television 183, for example, VTR (recording) is connected to a computer, it will be possible to record the pictures of videotape 190 using the computer.

In addition, since a storage apparatus, for example, a hard disk device 181 is connected to the computer, it becomes possible to record the digitized pictures which are inputted into the computer.

The picture stored at the storage apparatus such as the hard disk device 181 or CD-ROM device is reproduced at the computer screen, therefore, if the computer has the output terminal 221 for a video signal, it will be possible to record the picture on a videotape using VTR (recording). If a storage apparatus with a high speed memory and sufficiently large enough comes into existence, even if the picture quality of the videotape becomes higher, it will be possible to store the picture keeping the high quality and to output the video signal reproducing the high quality picture. FIG. 7 shows a block diagram for explaining an example of the prior art. A video decoder 3 digitizes a video signal 240 inputted at an input terminal 220 for a video signal. Digitized video information is stored as a screen information at a video memory 5. When the video information is inputted, the input data from the video decoder 3 is stored into the video memory 5 by a graphics controller 6. When a video information is outputted from a hard disk device 181, the output data is stored into the video memory 5 as every screen information by the graphics controller 6. RGB signal is outputted to a display device 9 out of the graphics controller 6, and a digital signal is outputted to a video encoder 7 out of the graphics controller 6. A video signal 241 converted to analogue from digital, at the graphics controller 6, is outputted to an output terminal 221 for a video signal.

CPU (Central Processing Unit) 4 controls both recording and reproducing the picture information digitized. The hard disk device 181 stores the picture information digitized under the control of CPU 4. In a case of reproducing, the picture information is read from the hard disk device 181. The display device 9 is connected to the graphics controller 6 and displays an output of computer including the picture information on the computer screen.

FIG. 8 shows a block diagram for explaining a video decoder of a prior art. A composite signal 250 is inputted to an input terminal 220 for a video signal of a computer and is separated into brightness signal (Y) and color signal (C) through Y/C separator 301. Y/C signal 251 is separated into a picture signal and a synchronizing signal 253 through NTSC decoder 302.

Y/C signal 251 of the picture signal is separated into YUV 252 (brightness and color difference). YUV 252 is converted to a digital signal by analogue/digital (A/D) converter 303 and both the digital signal and the synchronizing signal 253 are inputted to matrix circuit 254.

FIG. 9 is a time chart for explaining a video signal (analogue) including a copy guard signal. As shown in FIG. 9, a video signal of a television screen includes a vertical synchronizing pulse 200, a horizontal synchronizing pulse 201, and an image signal 202. The copy guard signal 210 inserted between a vertical blanking interval, not displayed at the television screen has a higher level than the image signal 202 in voltage.

NTSC decoder 302 in FIG. 8 separates the synchronizing signal 253 of the video signal from Y/C signal 251. When A/D converter 303 digitizes YUV 252, the copy guard signal 210 is dropped.

FIG. 10 is a time chart for explaining the video signal (digital) after A/D conversion. The signal 270 in FIG. 10 shows that the copy guard signal 210 is dropped. When the analogue signal is converted to the digital signal, the highest voltage level of the image signal 202 is defined as a standard. Therefore, if there is no function for detecting a copy guard signal, the high level in voltage of the copy guard signal is missing when YUV 252 is digitized.

FIG. 11 shows a time chart of the synchronizing pulse (the vertical synchronizing pulse 200 and the horizontal synchronizing pulse 201) after NTSC decoder 302 separates from Y/C signal 251. The picture information is obtained from the synchronizing pulse (200, 201) and the image signal 202 (digital) shown in FIG. 10. The picture information is recorded and reproduced on the computer system.

When an output terminal for a video signal such as the output terminal 202 is provided to a computer, it is possible to output video signal of pictures on the computer screen. And a copy guard signal might be dropped, even though the video signal including the copy guard signal is inputted. Thus, there is a problem such as it would be likely to reproduce pictures or audio programs in spite of having a copy guard signal, if VTR for recording is connected to the output terminal for a video signal of a computer.

SUMMARY OF THE INVENTION

Accordingly, it is an object of the present invention to provide an information processing apparatus for enabling both to protect a copyright and to reproduce pictures easily using a computer technology.

Another object of the present invention is to provide an information processing apparatus to prevent from illegal copying analogue pictures with copy guard, using a computer and VTR for recording connected to the computer.

In accordance with an aspect of the present invention, there is provided an image controlling circuit comprising a copy guard detecting circuit detecting a copy guard signal included in an input video signal, a video decoding circuit digitizing the input video signal and an image processing circuit processing screen information digitized by the video decoding circuit and storing the screen information processed to a storage device in a case where the copy guard detecting circuit detects the copy guard signal.

In accordance with an aspect of the present invention, there is provided a method for controlling image information, comprising the steps of detecting a copy guard signal included in an input video signal, digitizing the input video signal, processing screen information digitized in a case where the copy guard signal has been detected and storing the screen information processed to a storage device.

In accordance with an aspect of the present invention, there is provided a computer readable storage medium storing programs, where programs make a computer system to execute an image controlling process, the process comprising the steps of detecting a copy guard signal included in an input video signal and processing screen information digitized out of the input video signal in a case where the copy guard signal is detected.

BRIEF DESCRIPTION OF THE DRAWINGS

FIG. 1 is a drawing showing an example of recording or outputting to duplicate a digital signal;

FIG. 2 is a drawing showing an example of recording and duplicating of a video signal;

FIG. 3 is a waveform diagram of a video signal not including a copy guard signal;

FIG. 4 is a waveform diagram of a video signal including a copy guard signal;

FIG. 12 is a block diagram showing the principles of the present invention;

FIG. 17 is a circuit diagram showing an example of a register and a detector for detecting a copy guard signal;

FIG. 19 is an example of reduction regarding frames.

FIG. 22 is a flow chart showing a process of reduction regarding pixels, lines, and frames;

FIG. 25 is a table showing functions of the present invention;

FIG. 26 is a drawing showing access of a video memory (1); FIG. 27 is a drawing showing access of a video memory (2); and FIG. 27 is a drawing showing access of a video memory (2); and FIG. 28 is a table showing access of a video memory (3).

DETAILED DESCRIPTION OF THE PREFERRED EMBODIMENTS

Figure 5:
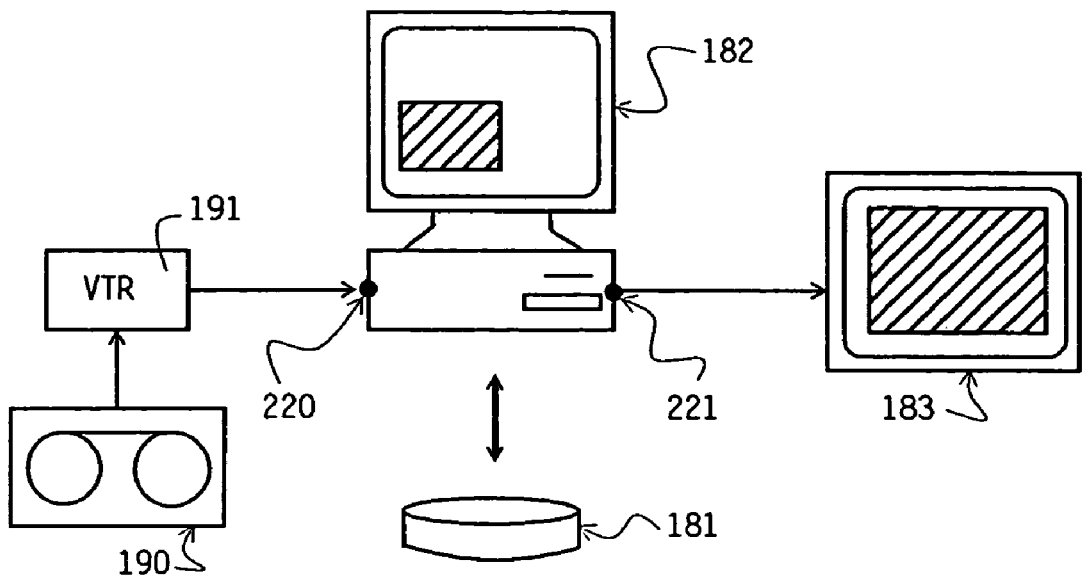
FIG. 5 is a drawing showing an example of a video signal and a computer screen (1)
Figure 6:
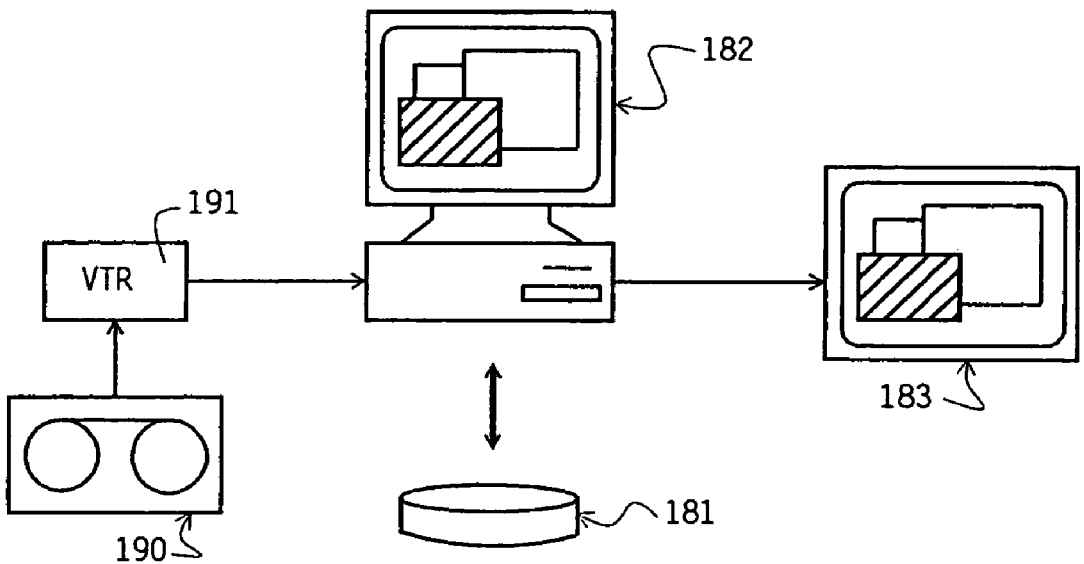
FIG. 6 is a drawing showing an example of a video signal and a computer screen (2)
Figure 7:
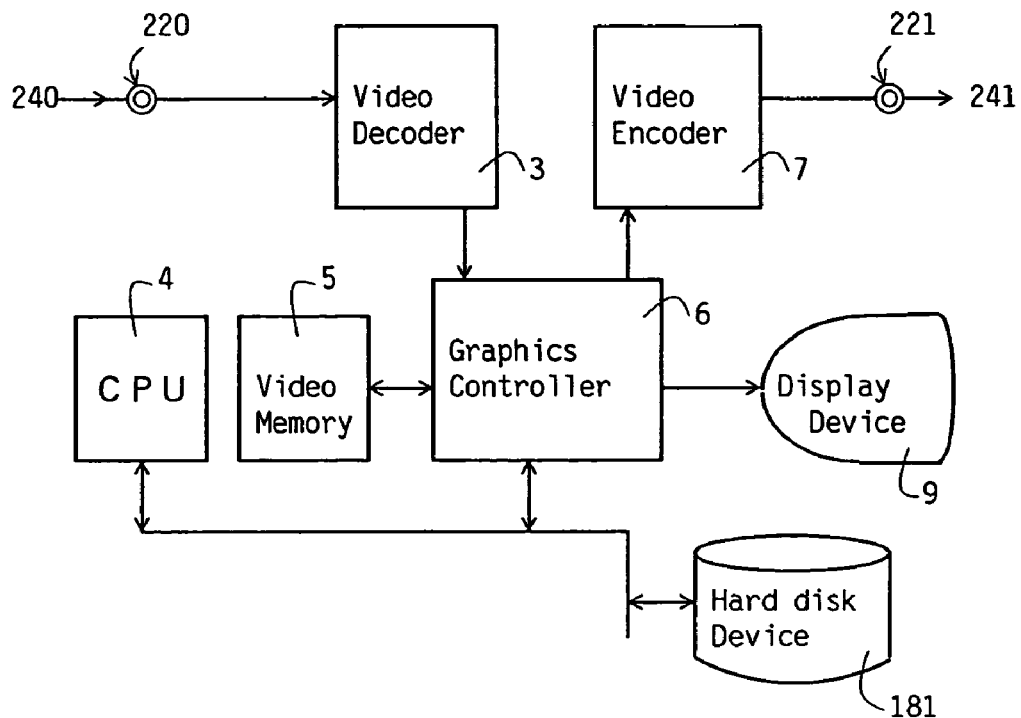
FIG. 7 is a block diagram showing an example of a prior art.
Figure 8:
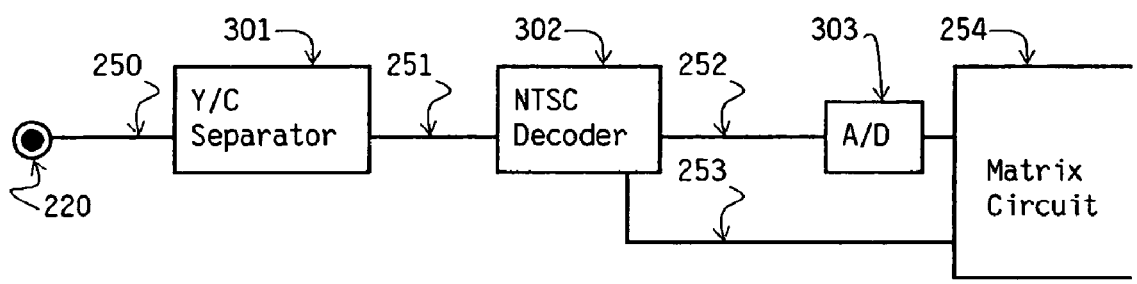
FIG. 8 is a block diagram showing a video decoder of a prior art.
Figure 9:
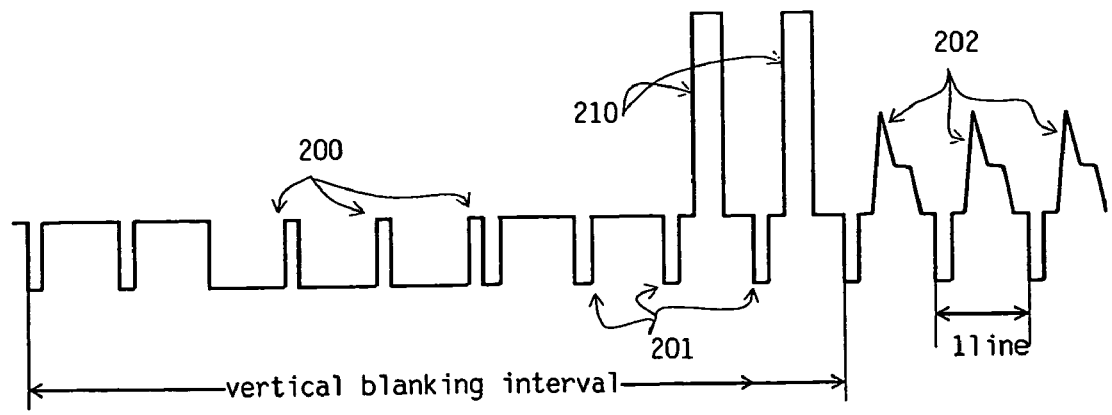
FIG. 9 is a waveform diagram of a video signal (analogue) including a copy guard signal.
Figure 10:
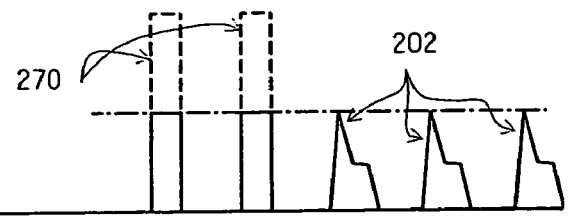
FIG. 10 is a waveform diagram of a video signal (digital) after analogue-digital conversion.

Preferred embodiments of the invention will be described below with reference to the accompanying drawings.

FIG. 12 shows a block diagram of an information processing apparatus for explaining the principles of the present invention. A copy guard detecting circuit 2 of the information processing apparatus 1 detects a copy guard signal included in a video signal 240 inputted at an input terminal 220 for a video signal. A video decoding circuit 3 digitizes the input video signal.

A graphics controlling circuit 6 controls both input and output of picture information, a series of screen information that is digitized video information, using a video memory 5. After data is inputted to the graphics controlling circuit 6 through the video decoding circuit 3, the data is initially stored at the video memory 5 as screen information, then the data is outputted to a video encoding circuit 7.

Data outputted from the video memory 5 can be recorded as picture information in the storage device 8. If picture information is both outputted as a video signal and recorded into the storage device 8, data is outputted to both the video encoding circuit 7 and the storage device 8.

On the other hand, when picture information recorded at the storage device 8 is reproduced, after the data is read from the storage device 8, the data is stored to the video memory 5 as screen information, and then the data is outputted to the video encoding circuit 7.

The picture information is digitized and stored as the screen information at the video memory 5 connected to the graphic controlling circuit 6, not only when it is inputted but also when it is outputted. The picture information digitized is recorded at the storage device 8.

A processing unit 4 shown in FIG. 12 has an image process instructing command 41 and a recording & reproducing command 42. The image process instructing command 41 instructs an image processing circuit 61 in graphics controlling circuit 6 to process the screen information stored at the video memory 5. And the image processing circuit 61 processes the screen information.

The image process instructing command 41 is issued when the copy guard detecting circuit 2 detects a copy guard signal or when the picture information stored at the storage device 8 is reproduced and it is copy-guarded.

When the image processing circuit 61 is instructed to process the screen information, to reduce a number of pixels (picture elements) for each screen or of screens for each frame (called frame reduction), and as a result of the process, the image quality is deteriorated.

The recording & reproducing command 42 controls to record or to reproduce the picture information. When the copy guard detecting circuit 2 detects a copy guard signal, the recording & reproducing command 42 is issued to the image processing circuit 61. And the image processing circuit 61 prohibits recording the picture information into the storage device 8, or stores that the copy guard signal has been detected into the storage device 8.

When the picture information stored in the storage device 8 is reproduced and copy-guarded, the recording & reproducing command 42 is issued to the image processing circuit 61. And the image processing circuit 61 prevents the video encoding circuit 7 from outputting of the video signal or controls the video encoding circuit 7 to add a copy guard signal to the video signal.

The video encoding circuit 7 connected to the graphic controlling circuit 6 encodes the picture signal and outputs a video signal 241 at an output terminal 221 for a video signal. Either when the input video signal has a copy guard signal, or when the picture information stored at the storage device 8 is copy-guarded, a copy guard signal is added to the output video signal 241, or the output video signal 241 is stopped at the video encoding circuit 7.

In this way, the picture information is processed so as to reduce quality thereof and is stored, or is not recorded, when a copy guard signal is detected. And the picture information is processed and outputted, or the output video signal is stopped, or a copy guard signal is added when a video signal including a copy guard signal is inputted or what is stored is copy-guarded. Therefore, is possible to protect from illegal copying using a computer or VTR for analogue recording.

Since the image quality is lowered when picture information is recorded, or recording itself is prohibited when a video signal having a copy guard signal is inputted, the picture information with high quality (high resolution or high flame-rate) is protected from copying at a storage device (a hard disk device). However, the picture with high quality is displayed at the computer screen.

Since the image quality is lowered, or outputting itself is prohibited, or a copy guard signal is added when a video signal having a copy guard signal or what is copy-guarded is outputted, the picture information with high quality is protected from being recorded at a VTR connected to the output terminal.

Hence, it becomes possible to copy pictures or audio programs easily, connecting VTR for analogue recording similar to VTR for digital recording and using a computer technology, without infringing a copyright.

Figure 13:
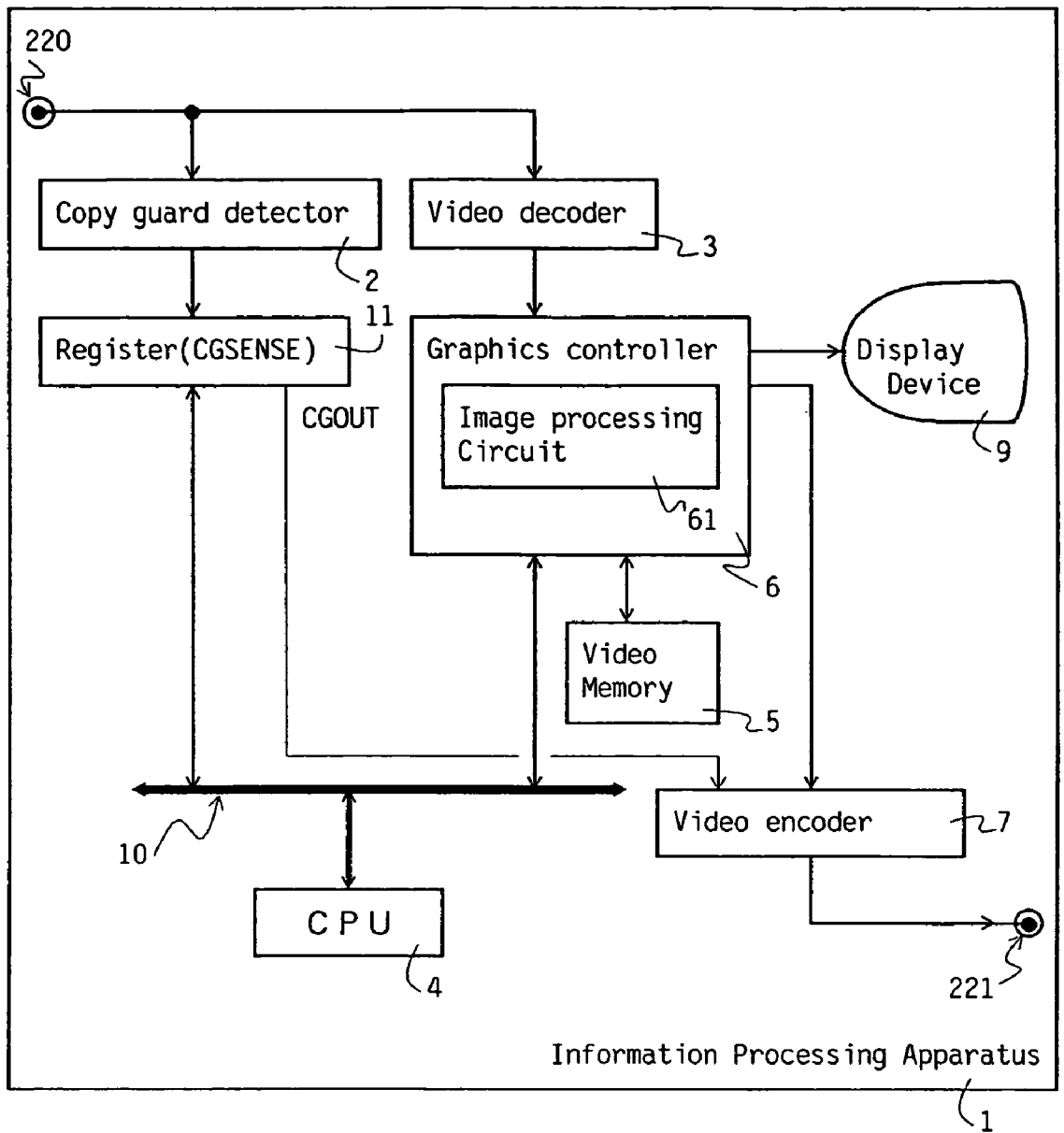
FIG. 13 is a block diagram showing a first embodiment according to the present invention.

FIG. 13 shows the block diagram of a first embodiment of information processing apparatus according to the present invention.

The information processing apparatus 1 has an input terminal 220 and an output terminal 221, each for a video signal. A composite signal which is an analogue video signal, is inputted to the input terminal 220 out of a videotape, etc.

A copy guard detector 2 detects a copy guard signal included in the composite signal and the copy guard signal is used for preventing from copying. A signal (CGSENSE) indicating that a copy guard signal is detected is retained at a register 11.

The register 11 is readable and writable under the control of CPU 4 (Central Processing Unit) through system bus 10. The CGSENSE signal set at the register 11 is sent to a video encoder 7 as a CGOUT signal.

The video signal is inputted to a video decoder 3. And the video signal is digitized at an A/D (Analogue/Digital) converter and outputted to a graphic controller 6. The digital data, inputted to the graphic controller 6 is stored into a video memory 5 per each frame through the graphic controller 6.

The video memory 5 is connected to the graphic controller 6. The picture information stored in the video memory 5 is outputted as a series of frame information both to the video encoder 7 and to a display device 9.

The video encoder 7 is connected to the graphic controller 6 and outputs the frame information stored in the video memory 5 as a video signal to the output terminal 221. The video signal is sent to a television or VTR through the output terminal 221 and the picture is reproduced on the television screen or recorded at the VTR.

The display device 9 is connected to the graphic controller 6, and displays the computer output including the picture information consisting of an RGB signal, which is outputted at the graphic controller 6.

CPU 4, the graphic controller 6 and the register 11 are connected to system bus, for example, PCI bus. CPU 4 controls the picture information which is inputted to the graphic controller 6 to display at the display device 9 or to output a video signal through the video encoder 7.

Figure 14:
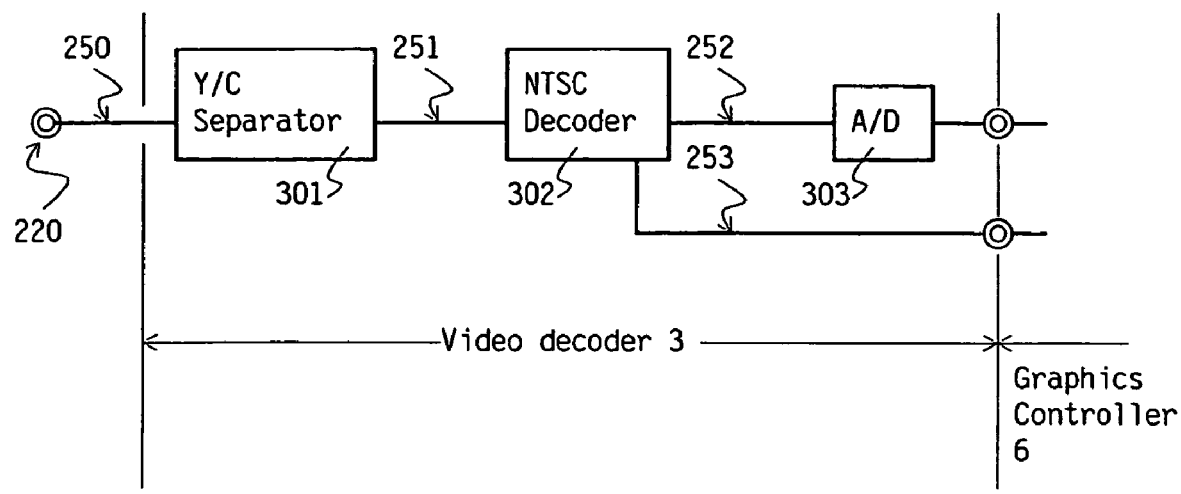
FIG. 14 is a block diagram showing a video decoder.

A block diagram of the video decoder 3 is shown in FIG. 14. The composite signal 250 is separated into brightness signal (Y) and a color signal (C) 251 through a Y/C separator 301. Y/C signal 251 is separated into a picture signal and a synchronizing signal 253 through a NTSC decoder 302. Y/C signal 251 of the picture signal is separated into YUV 252 (brightness and color difference). YUV 252 is converted to a digital signal by A/D converter 303 and both the digital signal and the synchronizing signal 253 are inputted to the graphic controller 6.

Figure 15:
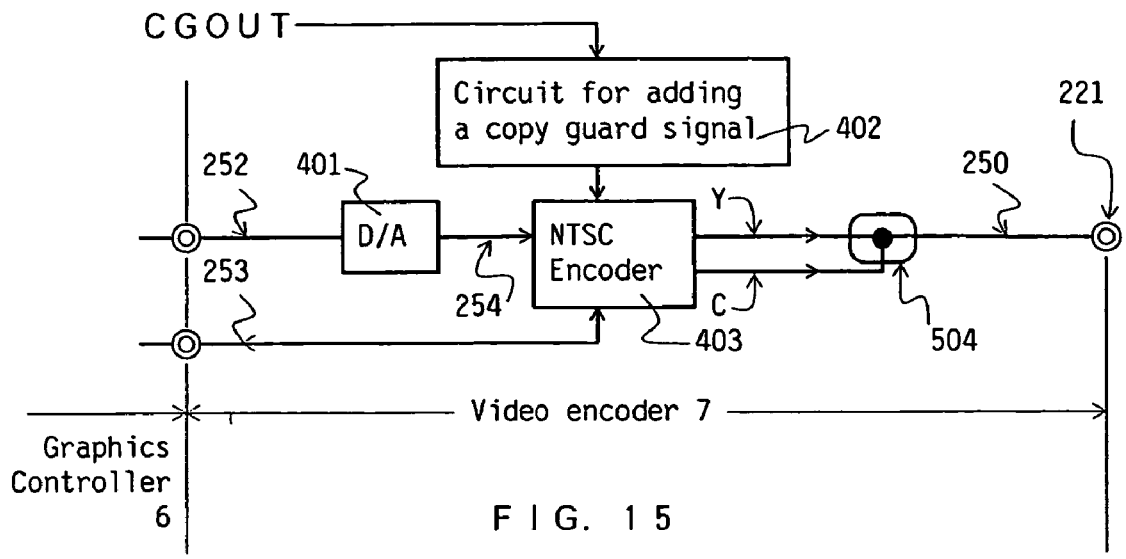
FIG. 15 is a block diagram of a video encoder with a circuit for adding a copy guard signal.
Figure 16:
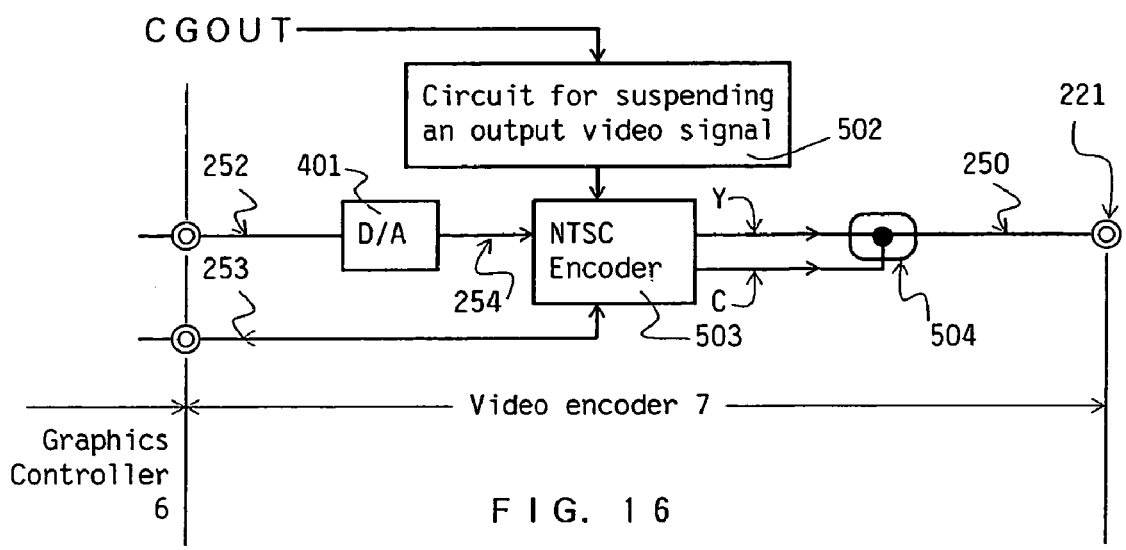
FIG. 16 is a block diagram of a video encoder with a circuit for suspending an output of a video signal.

A block diagram of the video encoder 7 is shown in FIG. 15 and FIG. 16. The image signal (YUV signal) of the screen information is converted to an analogue signal by a D/A (Digital/Analogue) converter 401 at the video encoder 7, and both the analogue signal 254 and the synchronizing signal 253 are inputted to NTSC encoder.

FIG. 15 shows a block diagram of the video encoder 7 with a circuit 402 for adding a copy guard signal to the output video signal. When the copy guard signal is added to the output video signal as shown in FIG. 15, CGOUT signal is effective. Then the circuit 402 generates pulses which work as the copy guard signal and inputs them into NTSC encoder 403.

Then, the copy guard signal, the analogue signal of YUV signal 254 and the synchronizing signal 253 are put together at NTSC encoder 403. And the NTSC encoder 403 outputs brightness signal Y and color signal C. Y signal and C signal are mixed at mixer 504, and mixer 504 outputs composite signal 250. Then, the composite signal 250 is outputted at the output terminal 221.

FIG. 16 shows a block diagram of the video encoder 7 with a circuit 502 for suspending the output of a video signal. When the output video signal is prohibited as shown in FIG. 16, CGOUT signal is effective. Then the circuit 502 generates a signal and inputs it into NTSC encoder 503 in order to suspend the video signal.

YUV signal 252 out of the graphics controller 6 is converted to analogue signal 254 at the D/A converter 401. The analogue signal of YUV 254 and the synchronizing signal 253 are inputted to a NTSC encoder 503, however, image signal is suspended and invalidated at the NTSC encoder 503 by the signal from the circuit 502. Then only the synchronizing signal is outputted at the output terminal 221. FIG. 17 shows a circuit diagram of an example of a register and a detector for detecting a copy guard signal. Copy guard detector 2 in FIG. 17 corresponds to the copy guard detector 2 in FIG. 13. Register 11 in FIG. 17 corresponds to the register 11 in FIG. 13.

Decoder 601 in FIG. 17 decodes 16 bits address (ADR0-15). 602, 603 and 604 are AND logic circuits, 605 shows an analogue comparator module, 606 is RS-type flip-flop, 607 is D-type flip-flop and 608 is tri-state type bus-driver, as shown in FIG. 17.

Video signal on television screen usually includes vertical synchronizing pulses, horizontal synchronizing pulses and image signals. The level of video signal for these image signals in voltage is generally 1 volt or so. Then, copy guard pulses, which level of pulse is 2 volts or so, are inserted in the video signal.

The analogue comparator module 605 compares the input level of the video signal to 1.5 volts and if it detects the voltage level higher than 1.5 volts, it sets the RS-type flip-flop 606 to "1".

ADR0-15, DATA0, DATA1, READ and WRITE shown in FIG. 17 are each, address, data, read signal and write signal on the system bus 10. When CPU 4 reads the register 11 through the system bus 10, the state of RS-type flip-flop 606 (CGSENSE) is outputted on data bus, bit 0 (DATA0) through the tri-state type bus-driver 608. When CPU 4 writes "1" to the register 11, bit 0 through the system bus 10, RS-type flip-flop 606 (CGSENSE) is reset to "0". When CPU 4 writes "1" to the register 11, bit 1, D-type flip-flop 607 is set to "1" (CGOUT).

In this way, when CPU 4 detects a copy guard signal through CGSENSE signal and sets CGOUT signal to "1", the copy guard becomes effective. Then, it is possible for video encoder 7 to add the copy guard signal to the video signal outputted at output terminal 221, as shown in FIG. 15, or to suspend the image signal outputted at output terminal 221, as shown in FIG. 16.

Similarly, when CPU 4 detects a copy guard signal and outputs the video signal at output terminal 221, CPU 4 can instruct an image processing circuit 61 in the graphic controllers to process the screen information stored at the video memory 5, as shown in FIG. 13.

When the image processing circuit 61 is instructed to process the screen information, pixels are reduced. Resulting of the reduction, the image quality has deteriorated.

There are three principal methods:
pixels are reduced at each screen, called pixel reduction;
reduction in lines, called line reduction; or
reduction in screens, called frame reduction.

Figure 18:
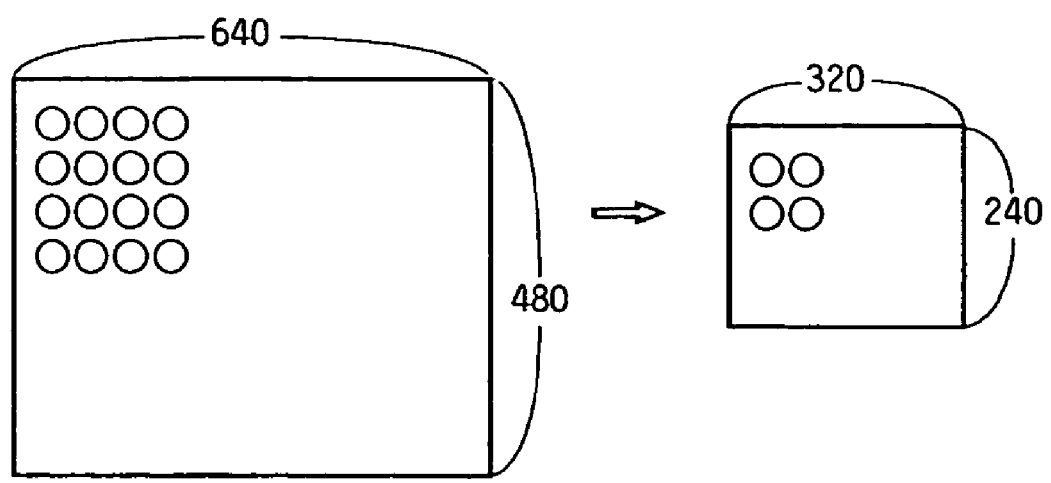
FIG. 18 is an example of reduction regarding pixels (picture elements)

FIG. 18 shows an example of pixel reduction. If the reduction ratio is ½, both in horizontal and in vertical pixel reduction, an aspect ratio or a resolution of screen is changed from (640×480) dots to (320×240) dots.

Pixel reduction is processed with a reduction ratio relative to number of dots or the aspect ratio of original image, therefore, not only the reduction ratio need not to be limited to ½, but also the aspect ratio need not to be limited to (4×3).

FIG. 19 shows an example of frame reduction. Frame reduction is processed with a reduction ratio, as follows. In a case of the ratio=½, every other frame is reduced (i.e., cancelled), then the ratio, 30 frames/second becomes 15 frames/second.

Reduction ratio in frame reduction need not be limited to ½ and instead may be ⅔, for example, resulting in that a frame ratio of 30 frames/second becomes 10 frames/second, as shown in FIG. 19.

Figure 20:
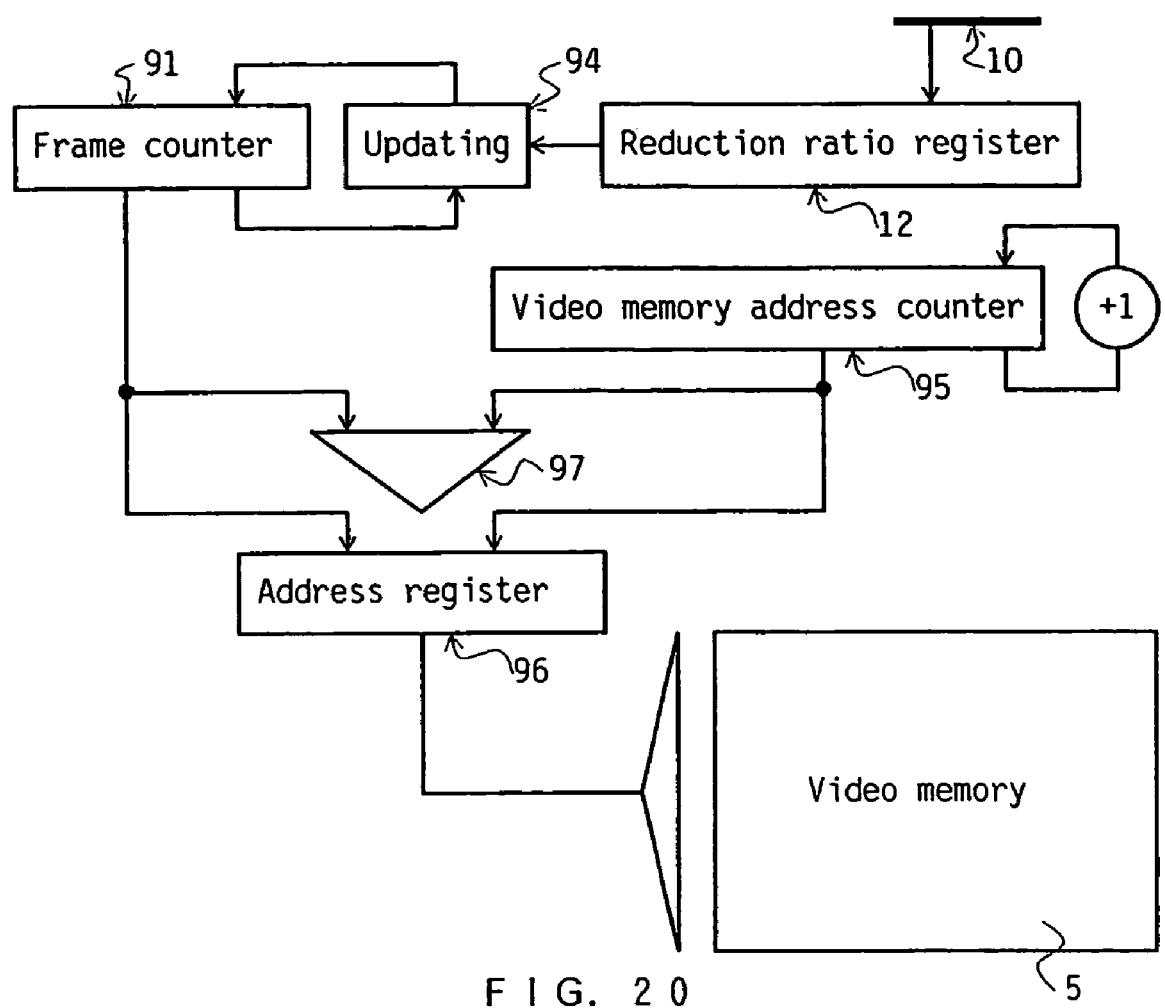
FIG. 20 is a block diagram showing a process of reduction regarding frames.

FIG. 20 shows a block diagram of a circuit for processing a reduction in frames. CPU 4 can write a reduction ratio to the reduction ratio register 12 connected to the system bus 10. A content of the reduction ratio register 12, a reduction ratio is sent to the updating part 94 of the frame counter 91.

An output of the frame counter 91 is sent to the address register 96 of the video memory 5 and the output of the frame counter is used to decide how many frames are skipped to read the video memory 5. CPU 4 instructs the frame counter 91 to start operation. Then the frame counter 91 is updated by the updating part 94 when the video memory 5 is read.

The amount of updating the frame counter is determined by a content of the updating part 94. When no reduction is specified, the quantity of updating is plus one, and when a reduction is performed, the frame counter 91 is updated according to a value specified at the reduction ratio register 12.

The output of the frame counter 91 sent to the address register 96 of the video memory 5 decides the address of the video memory 5 to read and is compared to a value of the video memory address counter 95 at comparator 97. When the output of the frame counter 91 agrees with the value of the video memory address counter 95, the output of the frame counter 91 is set to the address counter 96.

The video memory address counter 95 is used when the video memory 5 is read and updated one by one since there is no reduction performed when the frame is displayed on the display device 9.

The reduction ratio is set previously by CPU 4. The updating part 94 decides a quantity of updating corresponding to the reduction rate, as follows. If the reduction ratio was 75%, 3 frames are skipped. Then, the quantity of updating is plus 4. If the reduction ratio was 50%, every frame is skipped.

Then, the quantity of updating is plus 2. If the reduction ratio was 25%, 3 frames are read and a frame is skipped. Then, the quantity bf updating is plus 1, plus 1, plus 1 and plus 2.

Pixel reduction or line reduction is processed in the same way as frame reduction. In the case of pixel reduction, the reduction ratio set to the reduction ratio register 12 is sent to each updating part of line counter and pixel counter. The line counter decides which line to be read in a screen, and the pixel counter decides which pixel to be read in a line.

On the other hand, the picture information inputted is displayed on a screen of the display device 9, even if the picture information includes a copy guard signal, since the reduction in pixels which brings deterioration in image quality is not applied regarding the computer screen.

Similarly, it does not prevent from outputting to the display device 9, even though it may be prohibited to output the video signal at output terminal 221.

Figure 21:
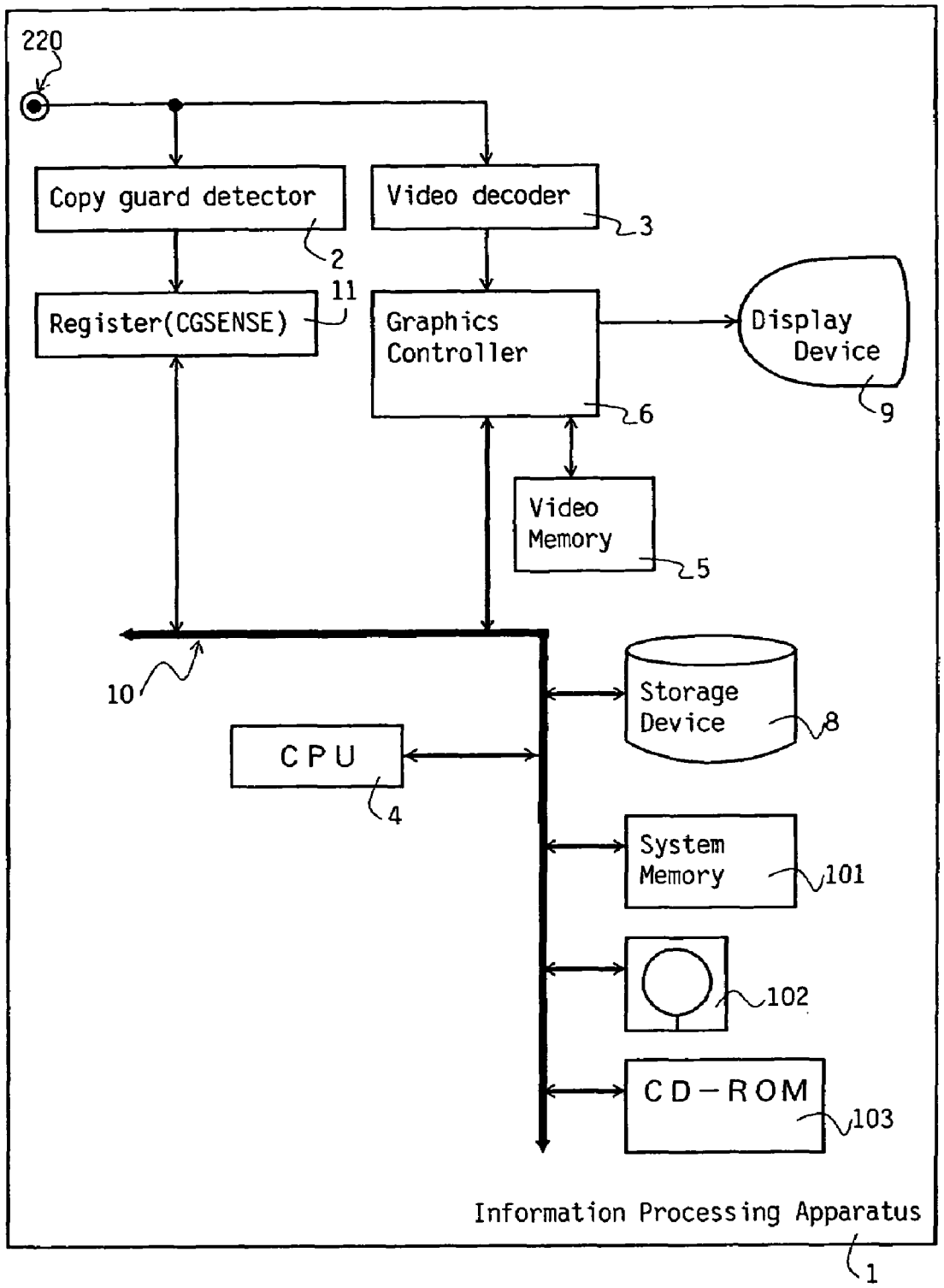
FIG. 21 is a block diagram showing a second embodiment according to the present invention.

FIG. 21 shows the block diagram of a second embodiment of information processing apparatus according to the present invention.

The information processing apparatus 1 has an input terminal 220 for a video signal, a storage device 8, system memory 101, floppy disk drive 102 and CD-ROM (Compact Disk-Read Only Memory) drive 103. The information processing apparatus 1 also has the copy guard detector 2, the video decoder 3, CPU 4, video memory 5, graphics controller 6, the display device 9 and the register 11.

It is similar to the first embodiment of this invention that CGSENSE signal is retained at the register 11 when the copy guard detector 2 detects a copy guard signal included in the input video signal. The video signal is inputted to the video decoder 3, digitized and outputted to the graphic controller 6. The digital data is inputted to the graphic controller 6 and it is stored into the video memory 5 per each frame.

CPU 4, the storage device 8, the system memory 101, floppy disk drive 102 and CD-ROM drive 103 are connected to the system bus 10. Operating system (OS), application software are unwound and stored into the system memory 101 and working area for these software are reserved at the system memory 101 and CPU 4 executes programs read out of the system memory 101.

First of all, OS and application software are stored at the storage device 8 (for example, hard disk drive), CD-ROM drive 103 or a floppy disk drive 102. After the information processing apparatus 1 is started, OS is started and application software is started.

Picture information stored at the video memory 5 as screen information can be outputted as a series of picture information and recorded in the storage device 8 of the information processing apparatus 1. The series of picture information may be displayed at the display device 9, too with the similar way to the first embodiment of the invention.

There are 3 types of methods of controlling picture information in the second embodiment of the invention in a case where CPU 4 is going to record picture information when CPU 4 detects a copy guard with it, as follows. The followings or a combination of the followings are available.

case 1. CPU 4 records the picture information with fact that a copy guard signal has been detected.

case 2. CPU 4 does not record the picture information.

case 3. CPU4 processes the picture information and records it in the storage device 8.

Figure 11:
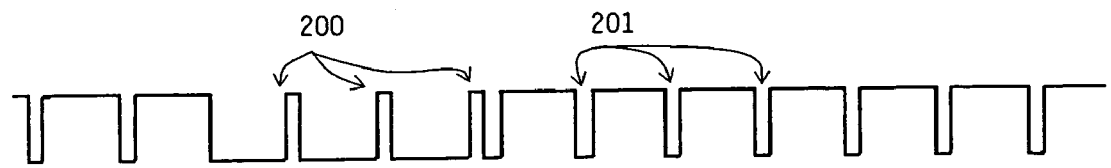
FIG. 11 is a waveform diagram of a synchronizing signal after separation of synchronizing signal and picture signal.

These controlling methods above mentioned are implemented as programs or software. And the software of which flowchart is shown in FIG. 11 is executed on a computer system including CPU 4. The software is stored in the storage device 8, loaded on the system memory 101 and executed by CPU 4.

The software is provided as a computer readable medium, such as a CD-ROM inserted at CD-ROM drive 103, or a floppy disk inserted at a floppy disk drive 102 and installed to a computer system such as the information processing apparatus 1. The software may be also obtained through a communication means and stored to the storage device 8.

When the picture information is recorded, CPU 4 instructs the graphics controller 6 to read the screen information, and the picture information is stored in the storage device 8 through the system bus 10.

When the picture information is processed and recorded, pixel reduction, line reduction or frame reduction regarding the screen information is processed. FIG. 22 is a flowchart of a process of reduction regarding pixels, lines and frames.

At the beginning of the program, the routine reads CGSENSE signal from the register 11 at step S100 and determines whether the copy guard signal is ON or OFF. Additionally, if the copy guard signal is ON, the routine moves on to step S120. If not, the routine moves on to step S102.

The screen information is read out of the video memory 5 through the graphics controller 6 and the picture information is recorded in the storage device 8 from step S102 onward. A line of the screen information is read out of the video memory 5 at step S102. Additionally, the routine goes to step S104.

A line of the screen information is divided into multiple pixels and more than a pixel is stored at the storage device 8 through the system bus 10 at step S104. Then the routine goes to step S106.

An address of pixels on a line stored in the storage device 8 is updated at step S106. The plus one (+1) is written at step 5106 in FIG. 22, although a plurality of pixels are stored at the same time and more than one is updated actually, since all of pixels read out of the video memory 5 is stored when no reduction is processed.

Then the routine goes to step S108. Whether recording a line of pixels is completed or not is determined at step S108. If not completed, the routine returns to step S104 and the routine stores next pixels at the line to the storage device 8. If completed, the routine goes to the step S110.

An address of lines with which the video memory 5 is read is updated at step S110. The address is updated by plus one (+1) since no line reduction is processed. Then the routine goes to step S112.

Whether recording a frame of pixels is completed or not is determined at the step S112. If not completed, the routine returns to step S102 and reads next line at the frame out of the video memory 5. If completed, the routine goes to step S114.

The frame counter indicating the order of frame is updated at the step S114. The frame counter is updated by plus one (+1) since no frame reduction is processed. Then the routine goes to step S116.

Whether next frame is stored or not at the video memory 5 is determined at step S116. If stored, the routine returns to step S102 and reads the line at next frame out of the video memory 5. If not stored, the routine goes to step S118. Whether all frame is recorded at the storage device 8 or not is determined at step S118. If not completed, the routine returns to step S116 and waits for next frame to be stored at the video memory 5. If frames are recorded at the storage device 8 completely, the program goes to the end.

On the other hand, the routine determines the recording mode selected in advance by the operator of the computer system before starting the computer system and the routine decides one of following 5 controls corresponding to the recording mode when the copy guard signal is ON at step S120.

The routine:
1. records the fact that a copy guard has been detected and records the picture information (from step S130 onward);
2. processes to lower the frame ratio and records the picture information with frame reduction (from step S140 onward);
3. processes to lower the line density and records the picture information with line reduction (from step S160 onward);
4. processes to lower the resolution and records the picture information with pixel reduction (from step S180 onward); and
5. does not record the picture information.

[In a Case of Storing the Fact that a Copy Guard has Been Detected]

The routine stores the fact that a copy guard has been detected at step S130. Then the routine goes to step S102. The routine reads the screen information out of the video memory 5 and records the picture information at the storage device 8 from step S102 onward.

[In a Case of Recording the Picture Information with Frame Reduction]

The routine lowers the frame ratio of the screen and records the picture information from step S140 onward. The routine from step S140 onward is similar to the routine from step S102, however, there is a difference between step S156 and step S114, at which the frame counter is updated.

The frame counter is updated by plus one (+1) at step S114 since no frame reduction is processed, but the frame counter is updated by plus two (+2) at step S156 since frame reduction is processed, resulting into next frame is skipped to store and frame ratio=50%.

[In a Case of Recording the Picture Information with Line Reduction]

The routine lowers the line ratio of the frame and records the picture information from step S160 onward. The routine from step S160 onward is similar to the routine from step S102, however, there is a difference between step S172 and step S110, at which the line address is updated.

The line address is updated by plus one (+1) at step S110 since no line reduction is processed, but line address is updated by plus two (+2) at step S172 since line reduction is processed, resulting into next line is skipped to store and line ratio-50%.

[In a Case of Recording the Picture Information with Pixel Reduction]

The routine lowers the resolution of the frame and records the picture information from step S180 onward. The routine from step S180 onward is similar to the routine from step S102, however, there are differences between step S188 and step S106, at which the pixel address is updated and between step S192 and step S10, at which the line address is updated.

The pixel address is updated by plus one (+1) at step S106 since no pixel reduction is processed, but pixel address is updated by plus two (+2) at step S188 since pixel reduction is processed, resulting into pixel in horizontal is skipped to store and pixel ratio in horizontal=50%.

The line address is updated by plus one (+1) at step S10 since no line reduction is processed, but the line address is updated by plus two (+2) at step S192 since line reduction is processed, resulting into next line is skipped to store and line ratio=50%. In other word, pixel ratio in vertical=50%, therefore resolution in pixel becomes 25%.

[In a Case of No Recording]

The routine queries and no recording is specified in the recording mode at step S120, the program goes to the end without recording the picture information to the storage device 8.

The picture information inputted at the input terminal 220 or read out of the storage device 8 is displayed on a screen of the display device 9, even though the picture information includes a copy guard signal.

Figure 23:
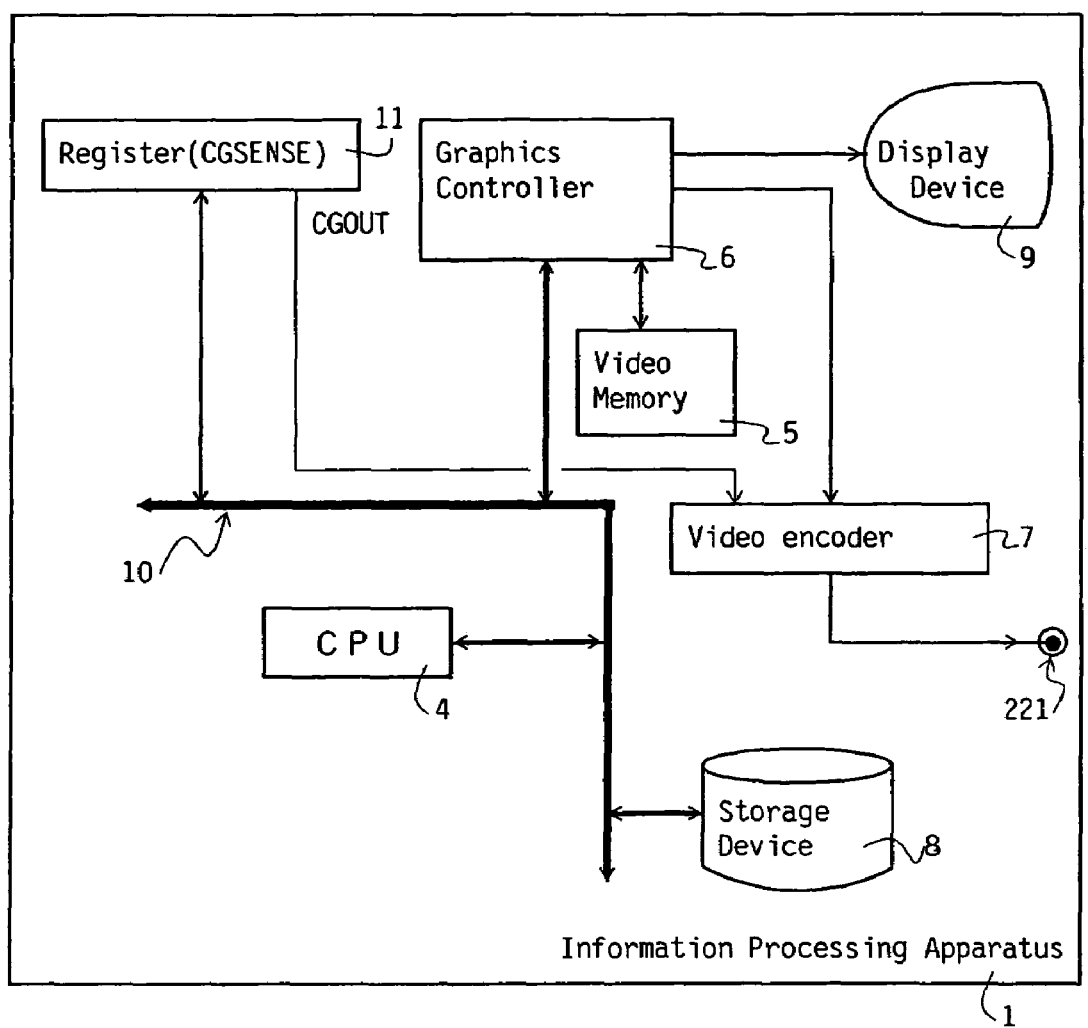
FIG. 23 is a block diagram showing a third embodiment according to the present invention.

FIG. 23 shows the block diagram of a third embodiment of the information processing apparatus according to the present invention.

The information processing apparatus 1 has CPU 4, the video memory 5, the graphics controller 6, the storage device 8, the display device 9, the register 11 and the output terminal 221 for a video signal. CPU 4, the graphics controller 6, the storage device 8 and the register 11 are connected to the system bus 10.

The picture information recorded at the storage device 9 is read, stored in the video memory 5 as each screen information, outputted to the output terminal 221 for video signal through the video encoder 7, and reproduced on the screen of the display device 9. The storage device 8 having high-speed memory large enough, such as a hard disk device or CD-ROM device is used for reproductions of the picture information. When the picture is not processed in recording, the unprocessed picture is outputted to the display device 9.

When the picture already recorded at the storage device 8 is reproduced and CPU 4 reads out of the storage device 8 fact that a copy guard has been detected, CPU 4 sets the register 11 to "1" (CGSENSE=1). Then CGOUT signal goes to "1" and CGOUT signal is sent to the video encoder 7, therefore, the copy guard becomes effective.

At that time above mentioned, one of following 3 controls are taken. The video encoder 7:

1. processes the picture information and outputs the video signal;
2. prevents from outputting the video signal; and
3. adds the copy guard signal to the output video signal.

Figure 24:
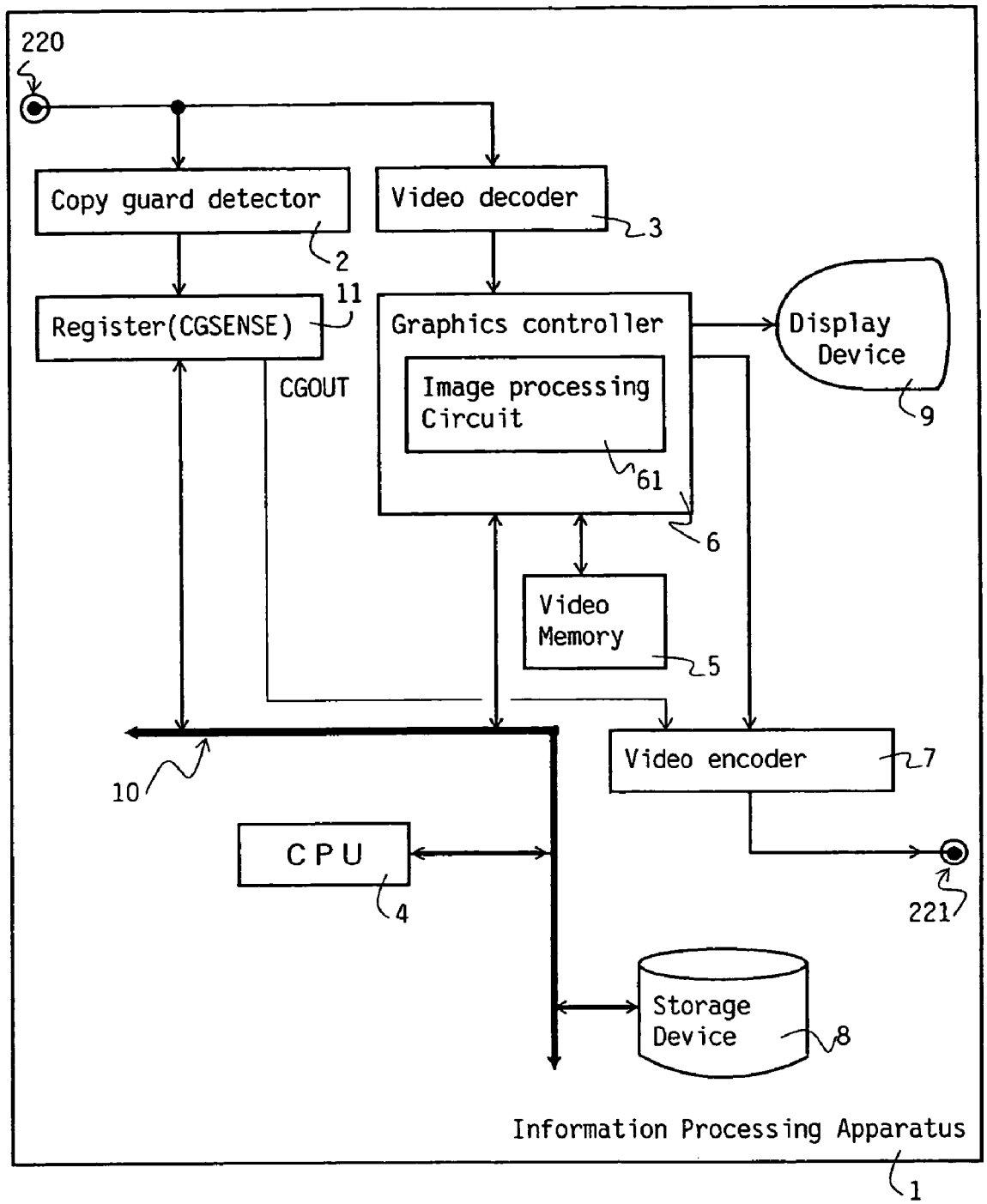
FIG. 24 is a block diagram showing a forth embodiment according to the present invention.

FIG. 24 shows the block diagram of a forth embodiment of the information processing apparatus according to the present invention.

The information processing apparatus 1 has the input terminal 220, the copy guard detector 2, the video decoder 3, CPU 4, the video memory 5, the graphics controller 6, the storage device 8, the display device 9, the register 11 and the output terminal 221. CPU 4, the graphics controller 6, the storage device 8 and the register 11 are connected to the system bus 10.

The configuration of the forth embodiment is combinations of the first through the third embodiment mentioned above. The information processing apparatus 1 reduces the pixels and records the picture, does not record the picture, does not output the video signal, adds a copy guard signal or reduces the pixels and outputs the video signal when a copy guard signal is detected at the input video signal. The information processing apparatus 1 does not output the video signal, adds a copy guard signal or reduces the pixels and outputs the video signal when the picture recorded at the storage device 8 has a copy guard.

FIG. 25 is a copy guard functions list. The list displayed at the computer screen enables for an operator to select a function. The operator selects one of copy guard functions which list is shown in FIG. 25 before starting the apparatus.

The copy guard functions are:

(a) to lower resolution and record;
(b) to lower frame rate and record;
(c) not to record;
(d) to stop outputting;
(e) to add copy guard;
(f) to lower resolution and output; and
(g) to lower frame rate and output.

When (a), (b), (e) or (f) is selected so that a resolution or a frame rate is lowered, farther, the resolution or the frame ratio can be specified. (a), (b) or (c) specifies the recording mode and is selected when the input picture is recorded at the storage device 8. (d), (e), (f) or (g) specifies the video outputting mode and decides a function when the input picture or the picture recorded at the storage device 8 is outputted as a video signal.

FIG. 26, FIG. 27, and FIG. 28 are drawings for explaining access of the video memory and operation of the graphics controller 7. The video memory 5 is accessed under the control of the graphics controller 7, and data is read or stored.

There are 2 access ports for writing to the video memory 5, video input (VW) out of the input terminal 220 and CPU input (CW) out of CPU 4 as shown in FIG. 26. CPU input (CW) is used when data out of the storage device 8 is stored or when the computer screen is updated.

There are 3 access ports for reading the video memory 5, video output (VR) to the output terminal 221, display output (DR) to the computer screen of the display device 9 and disk output (CR) to the storage device 8 as shown in FIG. 26. Disk output (CR) is used when CPU 4 stores data to the storage device 8.

The graphics controller 6 accesses the video memory 5 cyclically so that the video memory 5 is accessed equally when an access request occurs at these 5 access ports. The basic cycle consists of (VW), (DR), (CR), (CW), (VR) and (CR) as shown in FIG. 28.

In a case of recording the input video signal to the storage device 8 while outputting the video signal at the output terminal 221 and displaying the input video signal at the computer screen, these 5 access requests may occur at the same time as shown in FIG. 26.

When there is not any one of access request, the next request is executed. Therefore, it is possible to shorten the time required for a cycle. In a case of preventing from recording the input video signal to the storage device 8 while outputting the video signal at the output terminal 221 and displaying the input video signal at the computer screen, (VR), (DR) and (VR) access requests occur repeatedly. In addition, when the computer screen is updated, (CR) access request is added, then, (VR), (DR), (VR) and (CR) access requests occur repeatedly.

In a case of outputting the video signal at the output terminal 221 and displaying at the computer screen while reading the picture data out of the storage device 8, (CW), (VR) and (DR) access requests occur repeatedly as shown in FIG. 27. When both the request for storing data read out of the storage device 8 and the request for updating the computer screen occur at the same time, CPU input (CW) is used alternatively.

The order of priority is decided according to the frequency of access such as, CPU access ((CR) or (CW)) is lowered relatively, display output (DR) is raised highest, followed by video output (VR) and video input (VW). Therefore, it becomes possible both to maintain high quality of the computer screen (noise-less) and to output noise-less video signal.

Further to the above where a composite signal of video signal is inputted at video decoder or outputted at video encoder, it is possible to substitute S terminal signal of which Y (brightness) signal and C (color) signal are separated, and NTSC decoder may be replaced for PAL decoder. Still further to the above where a reduction of pixel is applied for an image processing, it is possible to reduce pixels and to add a signal in order to make a noise.

What is claimed is:

1. An image processing apparatus, comprising:
    a storage device recording screen information of picture information;
    a display device displaying screen information; and
    an image controlling circuit controlling input and output of picture information, comprising:
        a copy guard detecting circuit detecting a copy guard signal, indicating a copying prohibition, included in an input video signal of picture information,
        a video decoding circuit digitizing the input video signal,
        a video encoding circuit encoding screen information and outputting a video signal; and
        an image processing circuit storing to said storage device, both screen information digitized by said video decoding circuit and the fact of the detection by said copy guard detecting circuit of the copy guard signal, said image processing circuit further comprising a circuit reducing the screen information, to deteriorate an image quality, in a case where an output of screen information stored in the storage device is ordered, wherein screen information includes a first part and a second part and the stored reduced screen information includes only the first part, wherein the input video signal of picture information is outputted to the display device in order to display.

2. A method for controlling image information comprising:

detecting a copy guard signal, indicating a copying prohibition, included in an input video signal;

digitizing the input video signal;

outputting the digitized video signal to a display device;

storing both the screen information and a fact that the copy guard signal has been detected;

reducing the screen information stored at the storage device to deteriorate an image quality; and outputting a video signal of the reduced screen information, wherein outputting the reduced screen information is to output a part of the screen information and not to store another part of the screen information.

3. The image processing apparatus according to claim 1, wherein the inputted picture information displayable on a screen of a display device is not reduced.

4. The method for controlling image information according to claim 2, wherein reducing the digitized screen information is by at least one of pixel reduction, line reduction, and frame reduction.

* * * * *